(12) United States Patent
Joyce et al.

(10) Patent No.: US 7,075,067 B2
(45) Date of Patent: Jul. 11, 2006

(54) IONIZATION CHAMBERS FOR MASS SPECTROMETRY

(75) Inventors: Timothy H. Joyce, Mountain View, CA (US); Jennifer Qing Lu, Milpitas, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 41 days.

(21) Appl. No.: 10/966,191

(22) Filed: Oct. 15, 2004

(65) Prior Publication Data

US 2006/0081775 A1 Apr. 20, 2006

(51) Int. Cl.
*B01D 59/44* (2006.01)
*H01J 49/00* (2006.01)

(52) U.S. Cl. .................................................. 250/288
(58) Field of Classification Search ................ 250/288
See application file for complete search history.

(56) References Cited

U.S. PATENT DOCUMENTS 6,885,010 B1 * 4/2005 Traynor et al. ............. 250/427

* cited by examiner

*Primary Examiner*—Jack Berman
*Assistant Examiner*—Jennifer Yantorno

(57) ABSTRACT

An ionization chamber for a mass spectrometry system is described. The ionization chamber comprises a housing defining an ionization region, and the housing comprises a carbon nanotube material.

22 Claims, 2 Drawing Sheets

IONIZATION CHAMBERS FOR MASS SPECTROMETRY

TECHNICAL FIELD

The technical field of the invention relates to analytical instruments and, in particular, to mass spectrometry.

BACKGROUND

A variety of analytical instruments can be used for analyzing analytes such as organic molecules. More recently, mass spectrometry has gained prominence because of its ability to handle a wide variety of analytes with high sensitivity and rapid throughput. A variety of ion sources have been developed for use in mass spectrometry, and many of these ion sources comprise an ionization chamber. During operation, an analyte is introduced into the ionization chamber through some type of mechanism for sample introduction. Once the analyte is positioned within the ionization chamber, ions are produced from the analyte in accordance with an ionization process. Examples of ionization processes comprise electron impact ionization, chemical ionization, plasma bombardment ionization, fast ion or atom bombardment ionization, field desorption ionization, laser desorption ionization, plasma desorption ionization, thermospray ionization, electrospray ionization, and the like.

Characteristics of ions that are produced using an existing ionization chamber can depend upon characteristics of certain surfaces of the ionization chamber. In particular, inner surfaces of the ionization chamber are typically exposed to an analyte during operation of the ionization chamber, and interaction of the inner surfaces with the analyte can produce a number of undesired effects, such as reduced sensitivity, reduced accuracy, lack of reproducibility, and the like. For example, if a portion of the analyte adheres to or becomes adsorbed on the inner surfaces, that portion of the analyte is often not effectively ionized, thus reducing sensitivity of mass spectrometric analysis. Also, interaction of the inner surfaces with the analyte can sometimes cause the analyte to degrade, such as by converting into different types of organic molecules or other reaction products. Depending upon the particular analyte, a variety of unexpected ions can be produced as a result of such degradation, thus adversely impacting sensitivity as well as accuracy and reproducibility of mass spectrometric analysis.

Degradation of inner surfaces of an existing ionization chamber can also adversely impact mass spectrometric analysis. In particular, degradation of the inner surfaces during operation of the ionization chamber can introduce undesirable chemical background noise in the resulting mass spectrum. Contamination of the inner surfaces with residual analytes or reaction products from previous tests can also introduce undesirable chemical background noise in the resulting mass spectrum. Thus, proper cleaning of the inner surfaces can be important for mass spectrometric analysis, particularly for analytes that are present in low concentrations as is the case for pesticide residues, drug residues, metabolites, and the like. However, certain cleaning processes can be abrasive and can cause the inner surfaces to degrade, thus adversely impacting mass spectrometric analysis as described above.

SUMMARY

The invention provides a mass spectrometry system. The mass spectrometry system comprises an ion source to produce ions from a sample stream, and the ion source comprises an ionization chamber that comprises a carbon nanotube material. The mass spectrometry system also comprises a detector system positioned with respect to the ion source to detect the ions that are produced from the sample stream.

The invention also provides an ion source for a mass spectrometry system. The ion source comprises an ionization chamber comprising an inert carbon nanotube composite material.

The invention further provides an ionization chamber for a mass spectrometry system. The ionization chamber comprises a housing defining an ionization region, and the housing comprises a carbon nanotube material.

Advantageously, embodiments of the invention allow ions to be effectively produced from a sample stream, such that results of mass spectrometric analysis have a desired level of sensitivity, accuracy, and reproducibility. For some embodiments of the invention, effective ionization of the sample stream can be achieved using certain materials that are highly inert with respect to the sample stream. These materials can also exhibit a number of other desirable characteristics, such as being highly robust and highly electrically conductive.

Other embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings. In the drawings, like reference numbers are used to refer to like components.

DETAILED DESCRIPTION

Definitions

Figure 1A:
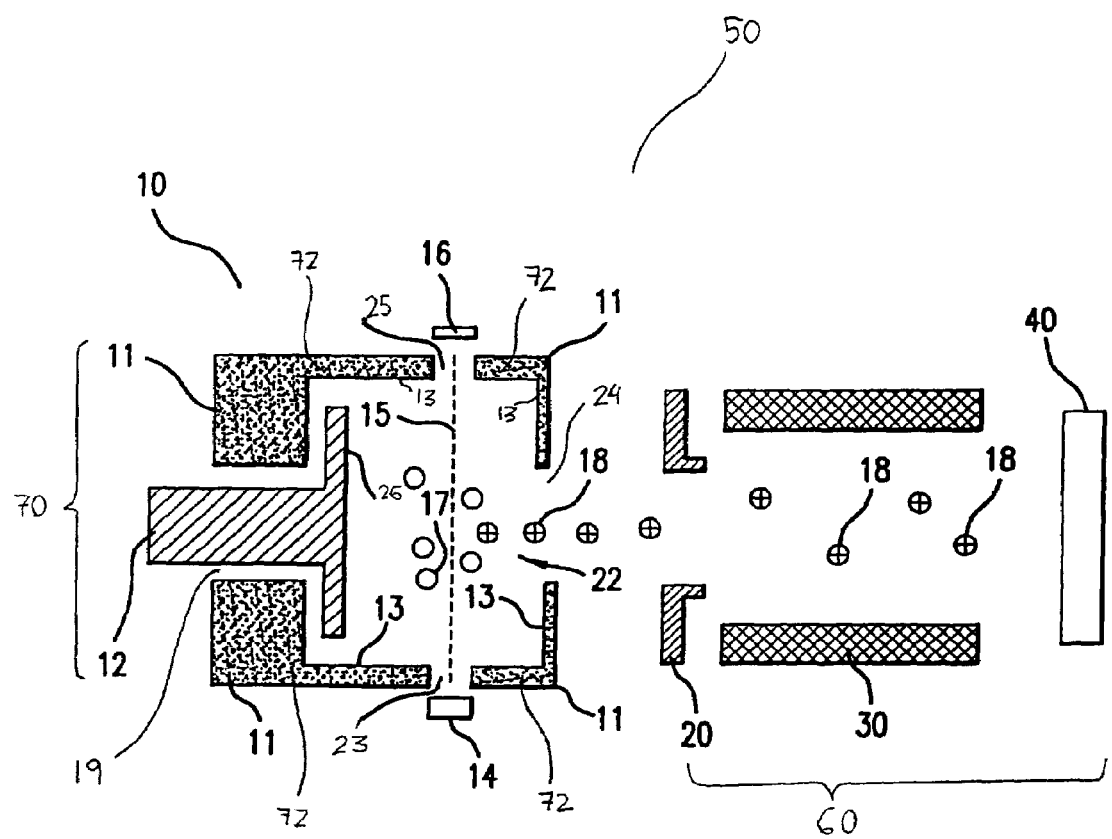
FIG. 1A illustrates a mass spectrometry system implemented in accordance with an embodiment of the invention.

The following definitions apply to some of the components described with respect to some embodiments of the invention. These definitions may likewise be expanded upon herein.

As used herein, the singular terms "a," "an," and "the" comprise plural referents unless the context clearly dictates otherwise.

As used herein, the term "set" refers to a collection of one or more elements. Thus, for example, a set of nanotubes can comprise a single nanotube or multiple nanotubes. Elements of a set can also be referred to as members of the set. Elements of a set can be the same or different. In some instances, elements of a set can share one or more common characteristics.

As used herein, the term "ionization chamber" refers to a structure that defines an ionization region. Typically, an ionization chamber comprises a portion of an ion source. However, it is contemplated that an ionization chamber can comprise a portion of another component of a mass spectrometry system, such as a mass analyzer.

As used herein, the term "ionization region" refers to a compartment in which ions are produced in accordance with an ionization process. Typically, an ionization region is at least partly bounded by inner surfaces of an ionization chamber.

As used herein with respect to an ionization chamber, the term "inner surface" refers to a surface of the ionization chamber that is exposed to a sample stream. An inner surface can be exposed to a sample stream without being in actual or direct contact with the sample stream. An inner surface can comprise any of a variety of regular and irregular shapes, such as flat, curved, jagged, stepped, and the like.

As used herein, the terms "inert" and "inertness" refer to a lack of interaction. Inert materials typically correspond to those materials that exhibit little or no tendency to interact with a sample stream under typical conditions, such as typical operating conditions of the ionization chambers described herein. Typically, inert materials also exhibit little or no tendency to interact with droplets, ions, or other reaction products produced from a sample stream in accordance with an ionization process. While a material is sometimes referred to herein as being inert, it is contemplated that the material can exhibit some detectable tendency to interact with a sample stream under certain conditions. One measure of inertness of a material is its chemical reactivity. In accordance with such measure, a material is typically considered to be inert if it exhibits little or no chemical reactivity with respect to a sample stream. Another measure of inertness of a material is its adhesion or adsorption characteristics. In accordance with such measure, a material is typically considered to be inert if it exhibits little or no tendency to adhere or adsorb a sample stream.

As used herein, the terms "robust" and "robustness" refer to a mechanical hardness, resiliency, stiffness, or strength. Robust materials typically correspond to those materials that exhibit little or no tendency to degrade under typical conditions, such as typical operating and typical cleaning conditions of the ionization chambers described herein. One measure of robustness of a material is its Vicker microhardness expressed in kg/mm. Typically, a material is considered to be robust if its Vicker microhardness is greater than 1,000 kg/mm.

As used herein, the terms "electrically conductive" and "electrical conductivity" refer to an ability to transport an electric current. Electrically conductive materials typically correspond to those materials that exhibit little or no opposition to flow of an electric current. One measure of electrical conductivity of a material is its resistivity expressed in $\Omega \cdot cm$. Typically, a material is considered to be electrically conductive if its resistivity is less than 0.1 $\Omega \cdot cm$. The resistivity of a material can sometimes vary with temperature. Thus, unless otherwise specified, the resistivity of a material is defined at room temperature.

As used herein, the term "microstructure" refers to a microscopic structure of a material and can encompass, for example, a lattice structure, crystallinity, dislocations, grain boundaries, constituent atoms, doping level, surface functionalization, and the like. Since a material can comprise components in the nanometer range, a microstructure of the material can sometimes be referred to as a nanostructure of the material. One example of a microstructure is a single-walled cylindrical structure, such as comprising a Single-Walled Carbon Nanotube ("SWCNT"). Another example of a microstructure is a multi-walled cylindrical structure, such as comprising a Multi-Walled Carbon Nanotube ("MWCNT"). A further example of a microstructure is an array or arrangement of nanotubes.

As used herein, the term "nanotube" refers to an elongated, hollow structure. Examples of nanotubes comprise those formed from carbon, namely carbon nanotubes. A carbon nanotube can be formed as a SWCNT or a MWCNT. A SWCNT can be represented as a single graphite layer that is rolled into a cylindrical shape. A SWCNT typically has a cross-sectional diameter that is less than about 5 nm, such as from about 0.4 nm to about 4 nm. A MWCNT can be represented as multiple graphite layers that are rolled into concentric cylindrical shapes. A MWCNT typically has a cross-sectional diameter that is about 5 nm or greater, such as from about 5 nm to about 70 nm. Both a SWCNT and a MWCNT typically have lengths from about 0.1 μm to about 1 mm. A SWCNT can sometimes exhibit a greater level of mechanical hardness or strength than a MWCNT and, thus, can be more desirable for certain implementations described herein. Other examples of nanotubes comprise those formed from silicon, gallium nitride, and the like. A nanotube, such as a SWCNT or a MWCNT, typically comprises a substantially ordered array or arrangement of atoms and, thus, can be referred to as being substantially ordered or having a substantially ordered microstructure. It is contemplated that a nanotube can comprise a range of defects and can be doped or surface functionalized. For example, a nanotube can be doped with metals, such as chromium, tungsten, iron, gold, titanium, molybdenum, and the like. Nanotubes can be formed using any of a wide variety of techniques, such as arc-discharge, laser ablation, chemical vapor deposition, and the like.

As used herein, the term "nanotube material" refers to a material that comprises a set of nanotubes. In some instances, a nanotube material can comprise a set of nanotubes that are substantially aligned with respect to one another or with respect to a certain axis, plane, surface, or three-dimensional shape and, thus, can be referred to as being substantially ordered or having a substantially ordered microstructure. One example of a nanotube material is one that comprises a set of carbon nanotubes, namely a carbon nanotube material.

As used herein, the term "composite material" refers to a material that comprises two or more different materials. In some instances, a composite material can comprise materials that share one or more common characteristics. One example of a composite material is one that comprises a carbon nanotube material, namely a carbon nanotube composite material. A carbon nanotube composite material typically comprises a matrix material and a set of carbon nanotubes dispersed in the matrix material. Examples of matrix materials comprise ceramics, glasses, metals, metal oxides, alloys, polymers, and the like. Additional examples of matrix materials comprise nitrides and disulfides as, for example, described in the patent of Perkins et al., "Ionization Chamber for Reactive Samples," U.S. Pat. No. 6,608,318, the disclosure of which is incorporated herein by reference in its entirety. Further examples of matrix materials comprise super alloys as, for example, described in the patent of Perkins, "Super Alloy Ionization Chamber for Reactive Samples," U.S. Pat. No. 6,765,215, the disclosure of which is incorporated herein by reference in its entirety. Composite materials, such as carbon nanotube composite materials, can be formed using any of a wide variety of techniques, such as colloidal processing, sol-gel processing, die casting, in situ polymerization, and the like.

Attention first turns to FIG. 1A, which illustrates a mass spectrometry system 50 implemented in accordance with an embodiment of the invention. The mass spectrometry system 50 comprises an ion source 10, which operates to produce ions. In the illustrated embodiment, the ion source 10 produces ions using electron impact ionization. However, it is contemplated that the ion source 10 can be implemented to produce ions using any other ionization process. As illustrated in FIG. 1A, the mass spectrometry system 50 also comprises a detector system 60, which is positioned with respect to the ion source 10 to receive ions. The detector system 60 operates to detect ions as a function of mass and charge.

In the illustrated embodiment, the ion source 10 comprises an ionization chamber 70. The ionization chamber 70 comprises a housing 11 that defines apertures 19, 23, 24, and 25. The ionization chamber 70 also comprises an electrode 12, which is positioned adjacent to the housing 11 and extends through the aperture 19. As illustrated in FIG. 1A, the housing 11 and the electrode 12 comprise inner surfaces 13 and 26, which define an ionization region 22 into which a sample stream is introduced. The sample stream comprises an analyte 17 to be analyzed by the mass spectrometry system 50. For example, the sample stream can comprise organic molecules that are introduced into the ionization region 22 in a vapor form from a gas chromatography device (not illustrated).

As illustrated in FIG. 1A, the housing 11 comprises an inert material 72. Advantageously, use of the inert material 72 reduces interaction with the sample stream, such that results of mass spectrometric analysis have a desired level of sensitivity, accuracy, and reproducibility. In the illustrated embodiment, at least the inner surfaces 13 of the housing 11 comprise the inert material 72. For certain implementations, the housing 11 can be substantially formed of the inert material 72. As further described below, it is also contemplated that the inert material 72 can form an inner coating of the housing 11.

In the illustrated embodiment, the ion source 10 also comprises a filament 14 and an electron collector 16, which are positioned adjacent to the apertures 23 and 25, respectively. During operation, the filament 14 produces an electron beam 15, which passes into the ionization region 22 through the aperture 23 and reaches the electron collector 16 through the aperture 25. The electron beam 15 interacts with the sample stream within the ionization region 22 to produce ions 18. As illustrated in FIG. 1A, the ions 18 are repelled by the electrode 12, which is charged to a repelling voltage with respect to the ions 18. The repelling voltage directs the ions 18 through the aperture 24 and towards the detector system 60.

Referring to FIG. 1A, the detector system 60 comprises a lens 20, a mass analyzer 30, and a detector 40. During operation, the ions 18 pass through the lens 20 and reach the mass analyzer 30, which separates or selects the ions 18 by mass-to-charge ratio. In the illustrated embodiment, the mass analyzer 30 is implemented as a quadrupole mass spectrometer. However, it is contemplated that other types of mass analyzers can be used, such as ion trap devices, time-of-flight devices, magnetic sector spectrometers, and the like. As illustrated in FIG. 1A, the ions 18 eventually reach the detector 40, which detects the abundance of the ions 18 and produces a mass spectrum.

It has been discovered that certain nanotube materials can be highly inert with respect to typical analytes for mass spectrometry. In the illustrated embodiment, the inert material 72 desirably comprises a carbon nanotube material, such as a carbon nanotube composite material. However, it is contemplated that other types of nanotube materials, such as those comprising nanotubes formed from gallium nitride, can be used in place of, or in conjunction with, a carbon nanotube material. Advantageously, a carbon nanotube material can exhibit a higher level of inertness with respect to typical analytes as compared with certain other types of inert materials. In addition, a carbon nanotube material can exhibit a higher level of inertness with respect to certain reactive analytes. Examples of reactive analytes comprise acetophenone, 2-acetylaminofluorene, 1-acetyl-2-thiourea, aldrin, 4-aminobiphenyl, aramite, barban, benzidine, benzoic acid, benzo(a)pyrene, 1,4-dichlorobenzene, 2,4-dinitrophenol, hexachlorocyclopentadiene, 4-nitrophenol, N-nitroso-di-n-propylamine, and certain other molecules present in solid wastes, soils, and water samples. Accordingly, use of a carbon nanotube material can reduce interaction with analytes for a current test as well as reduce contamination of the inner surfaces 13 with residual analytes or reaction products from previous tests.

In conjunction with being highly inert, a carbon nanotube material can exhibit a number of other characteristics that are desirable for mass spectrometry. Without wishing to be bound by a particular theory, it is believed that a particular microstructure of a carbon nanotube material contributes to at least some of its desirable and unusual characteristics. Advantageously, this microstructure can be precisely controlled, such as by doping, surface functionalization, or alignment of a set of carbon nanotubes, which, in turn, allows fine-tuned control of the characteristics of the carbon nanotube material.

For example, another benefit of a carbon nanotube material is that it can be highly robust when implemented in the ionization chamber 70. Thus, the carbon nanotube material can exhibit little or no tendency to degrade under typical operating conditions of the ionization chamber 70, thus increasing operational lifetime of the ionization chamber 70. Robustness of the carbon nanotube material can also allow the ionization chamber 70 to be readily cleaned, such as using abrasives. In the case of a carbon nanotube composite material, a set of carbon nanotubes can exhibit unusual levels of resiliency, stiffness, and strength and, thus, can serve as a reinforcing component to provide improved robustness to a matrix material within which the set of carbon nanotubes are dispersed. For certain implementations, a carbon nanotube material can exhibit a Vicker microhardness that is greater than 1,000 kg/mm, such as greater than about 2,000 kg/mm, greater than about 2,500 kg/mm, or greater than about 3,000 kg/mm. For example, the Vicker microhardness is desirably from about 2,500 kg/mm to about 3,500 kg/mm.

Also, a carbon nanotube material can be highly electrically conductive when implemented in the ionization chamber 70. Thus, the inner surfaces 13 of the housing 11 can exhibit little or no tendency to accumulate charge during operation of the ionization chamber 70. As can be appreciated, such charge accumulation can cause arcing or distortion of an electric field within the ionization chamber 70, which can adversely impact mass spectrometric analysis. In the case of a carbon nanotube composite material, a set of carbon nanotubes can serve as an electrically conductive component to provide improved electrical conductivity to a matrix material within which the set of carbon nanotubes are dispersed. For certain implementations, a carbon nanotube material can exhibit a resistivity that is less than 0.1 $\Omega \cdot cm$, such as less than about 0.01 $\Omega \cdot cm$, less than about 0.001 $\Omega \cdot cm$, or less than about 0.0001 $\Omega \cdot cm$.

A further benefit of a carbon nanotube material is that it can be readily and inexpensively formed and implemented in the ionization chamber 70. In the case of a carbon nanotube composite material, the ionization chamber 70 can be readily and inexpensively formed using the carbon nanotube composite material in accordance with any of a wide variety of composite material processing techniques.

Figure 1B:
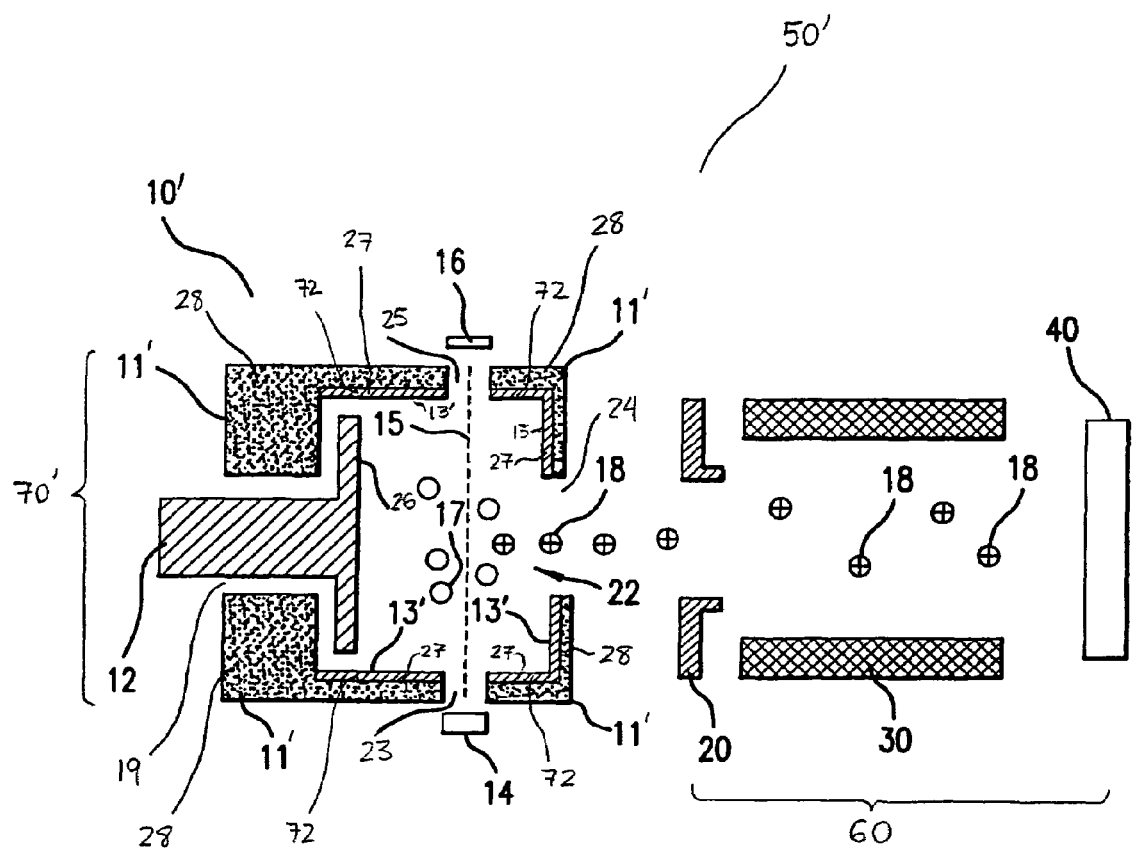
FIG. 1B illustrates a mass spectrometry system implemented in accordance with another embodiment of the invention.

Attention next turns to FIG. 1B, which illustrates a mass spectrometry system 50' implemented in accordance with another embodiment of the invention. Certain components of the mass spectrometry system 50' can be implemented in a similar fashion as previously described for the mass spectrometry system 50 and, thus, need not be further described herein.

In the illustrated embodiment, the mass spectrometry system 50' comprises an ion source 10' that comprises an ionization chamber 70'. The ionization chamber 70' comprises a housing 11', which comprises a substrate 28 and an inner coating 27 that at least partly covers the substrate 28. In the illustrated embodiment, the inner coating 27 comprise the inert material 72, which desirably comprises a carbon nanotube material. As illustrated in FIG. 1B, the inner coating 27 comprises inner surfaces 13' that provide reduced interaction with a sample stream. The inner coating 27 can be formed using any of a wide variety of coating techniques. For example, the inert material 72 can be sprayed at high velocity onto the substrate 28, such that the inert material 72 adheres to the substrate 28. As another example, the inert material 72 can be dispersed in a suitable solvent to form a "paint," and this paint can be applied to the substrate 28. In some instances, the solvent can be relatively inert. However, it is also contemplated that the solvent can facilitate adhesion between the inert material 72 and the substrate 28. Heat can be applied to evaporate the solvent or to promote adhesion. The particular coating technique used can affect characteristics of the inner coating 27. For certain implementations, it is desirable to produce the inner coating 27 so as to be generally smooth and of generally uniform thickness. As can be appreciated, smoothness of the inner coating 27 tends to provide a lower surface area, thus rendering the inner coating 27 kinetically unfavorable for interaction with the sample stream.

It should be recognized that the embodiments of the invention described above are provided by way of example, and various other embodiments are encompassed by the invention. For example, while FIG. 1A illustrates the housing 11 as comprising the inert material 72, it is contemplated that other portions of the ion source 10 can comprise the inert material 72. In particular, it is contemplated that any portion of the ionization chamber 70 that is exposed to the sample stream can comprise the inert material 72. For example, at least the inner surface 26 of the electrode 12 can also comprise the inert material 72. In general, it is contemplated that different portions of the ionization chamber 70 can comprise inert materials that are the same or different.

A practitioner of ordinary skill in the art requires no additional explanation in developing the ionization chambers described herein but may nevertheless find some helpful guidance regarding characteristics and formation of carbon nanotube materials by examining the following articles: Gavalas V. G. et al., "Carbon Nanotube Sol-Gel Composite Materials," *NanoLetters*, vol. 1, pp. 719–721, 2001; Bian Z. et al., "Carbon-Nanotube-Reinforced $Zr_{52.5}Cu_{17.9}Ni_{14.6}Al_{10}Ti_5$ Bulk Metallic Glass Composites," *Applied Physics Letters*, vol. 81, pp. 4739–4741, 2002; Sun J. et al., "Colloidal Processing of Carbon Nanotube/Alumina Composites," *Chem. Mater.*, vol. 14, pp. 5169–5172, 2002; and Velasco-Santos C. et al., "Improvement of Thermal and Mechanical Properties of Carbon Nanotube Composites Through Chemical Functionalization," *Chem. Mater.*, vol. 15, pp. 4470–4475, 2003; the disclosures of which are incorporated herein by reference in their entireties. A practitioner of ordinary skill in the art may also find some helpful guidance regarding characteristics and formation of carbon nanotubes by examining the following articles: Saito Y., "Preparation and Properties of Carbon Nanotubes," 1999 *International Symposium on Micromechatronics and Human Science*, 1999; Dai H., "Carbon Nanotubes: Synthesis, Integration, and Properties," *Accounts of Chemical Research*, vol. 35, pp. 1035–1044, 2002; and Dai H., "Carbon Nanotubes: Opportunities and Challenges," *Surface Science*, vol. 500, pp. 218–241, 2002; the disclosures of which are incorporated herein by reference in their entireties.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process operation or operations, to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

We claim:

1. An ionization chamber for a mass spectrometry system comprising:
   a housing defining an ionization region, the housing comprising a carbon nanotube material
   wherein the carbon nanotube material comprises a carbon nanotube composite material.

2. The ionization chamber of claim 1, wherein the carbon nanotube composite material comprises a matrix material and a set of carbon nanotubes dispersed in the matrix material.

3. The ionization chamber of claim 2, wherein the matrix material is selected from the group consisting of ceramics, glasses, metals, metal oxides, alloys, and polymers.

4. The ionization chamber of claim 1, wherein the carbon nanotube material is inert.

5. The ionization chamber of claim 1, wherein the carbon nanotube material comprises a Vicker microhardness that is greater than 1,000 kg/mm.

6. The ionization chamber of claim 5, wherein the Vicker microhardness is greater than 2,000 kg/mm.

7. The ionization chamber of claim 1, wherein the housing comprises inner surfaces that define the ionization region, and the inner surfaces comprise the carbon nanotube material.

8. An ion source for a mass spectrometry system, comprising:
   an ionization chamber comprising an inert carbon nanotube composite material.

9. The ion source of claim 8, wherein the inert carbon nanotube composite material comprises a matrix material and a set of single-walled carbon nanotubes dispersed in the matrix material.

10. The ion source of claim 8, wherein the inert carbon nanotube composite material comprises a matrix material and a set of multi-walled carbon nanotubes dispersed in the matrix material.

11. The ion source of claim 8, wherein the inert carbon nanotube composite material comprises a resistivity that is less than 0.1 Ω·cm.

12. The ion source of claim 11, wherein the resistivity is less than 0.01 Ω·cm.

13. The ion source of claim 8, wherein the ionization chamber comprises a housing that defines an ionization region, and the housing comprises the inert carbon nanotube material.

14. The ion source of claim 13, wherein the housing comprises an inner coating, and the inner coating comprises the inert carbon nanotube composite material.

15. The ion source of claim 14, wherein the housing further comprises a substrate, and the inner coating at least partly covers the substrate.

16. A mass spectrometry system, comprising:
 (a) an ion source to produce ions from a sample stream, the ion source comprising an ionization chamber that comprises an inert carbon nanotube composite material; and
 (b) a detector system positioned with respect to the ion source to detect the ions that are produced from the sample stream.

17. The mass spectrometry system of claim 16, wherein the carbon nanotube material is inert with respect to the sample stream.

18. The mass spectrometry system of claim 16, wherein the carbon nanotube material comprises a Vicker microhardness that is greater than 1,000 kg/mm.

19. The mass spectrometry system of claim 16, wherein the ionization chamber comprises:

a housing comprising an aperture; and
 an electrode positioned with respect to the housing, wherein, when a repelling voltage is applied to the electrode, the ions that are produced from the sample stream are directed towards the aperture,
 wherein at least one of the housing and the electrode comprises the carbon nanotube material.

20. An ion source for a mass spectrometry system, comprising:
 an ionization chamber defining an ionization region having an inner surface comprising a carbon nanotube composite material, the ionization chamber having an inlet; and
 a source of energetic particles or radiation disposed externally to the ionization chamber and adjacent to the inlet for providing energetic particles or radiation into the ionization region.

21. The ion source of claim 20, wherein the source of energetic particles or radiation comprises an electron source.

22. An ionization chamber for a mass spectrometry system comprising:
 a housing defining an ionization region, the housing comprising a non-emitting carbon nanotube composite material.

* * * * *